Sept. 8, 1959  C. B. NELSON  2,903,267
CENTERING AND LOCKING MEANS
Filed Aug. 26, 1953  3 Sheets-Sheet 1

INVENTOR
Corless B. Nelson
BY
J.C. Thorpe
ATTORNEY

Sept. 8, 1959
C. B. NELSON
2,903,267
CENTERING AND LOCKING MEANS
Filed Aug. 26, 1953
3 Sheets-Sheet 2
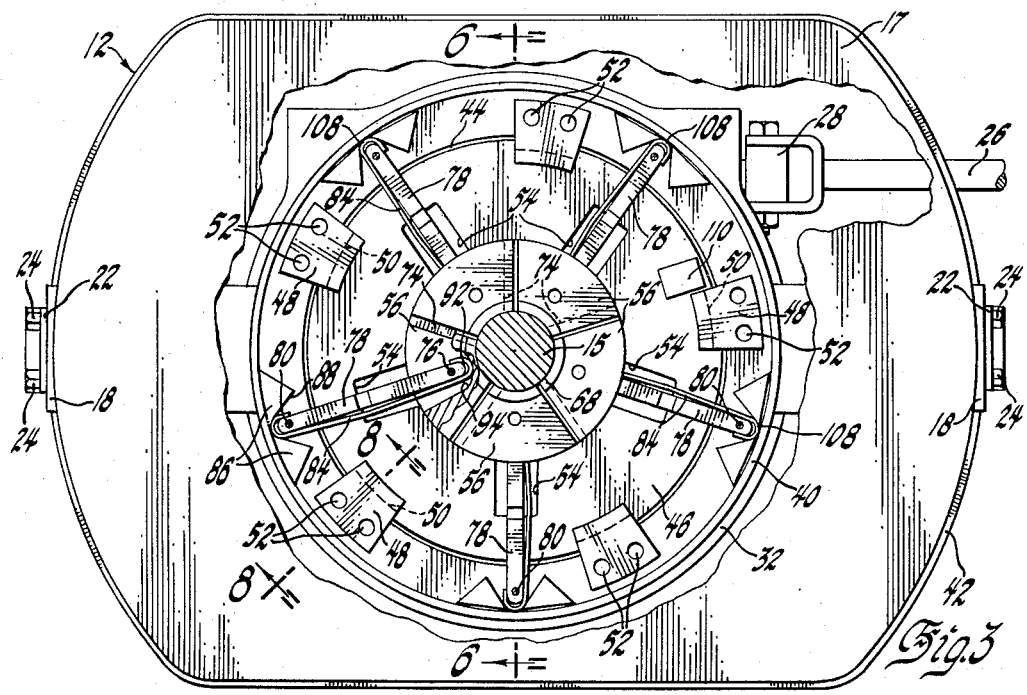
Fig. 3
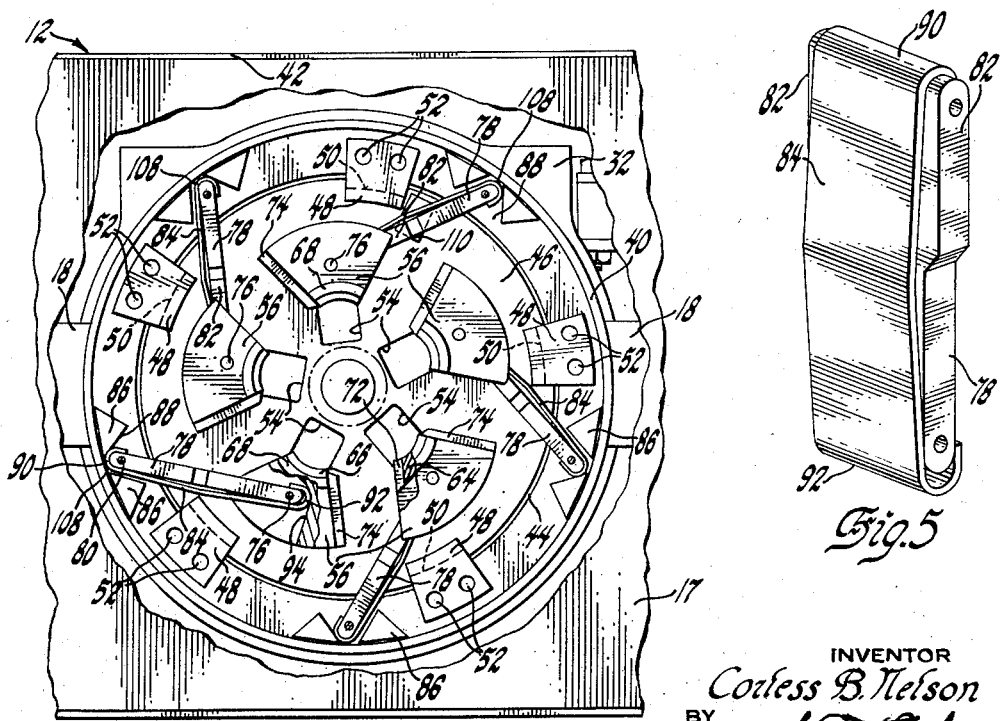
Fig. 4
Fig. 5
INVENTOR
*Corless B. Nelson*
BY
*J. C. Thorpe*
ATTORNEY Sept. 8, 1959 C. B. NELSON 2,903,267
CENTERING AND LOCKING MEANS
Filed Aug. 26, 1953 3 Sheets-Sheet 3
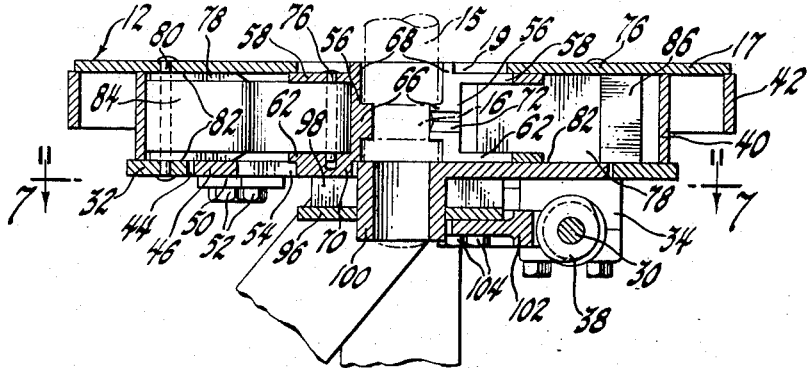
Fig.6
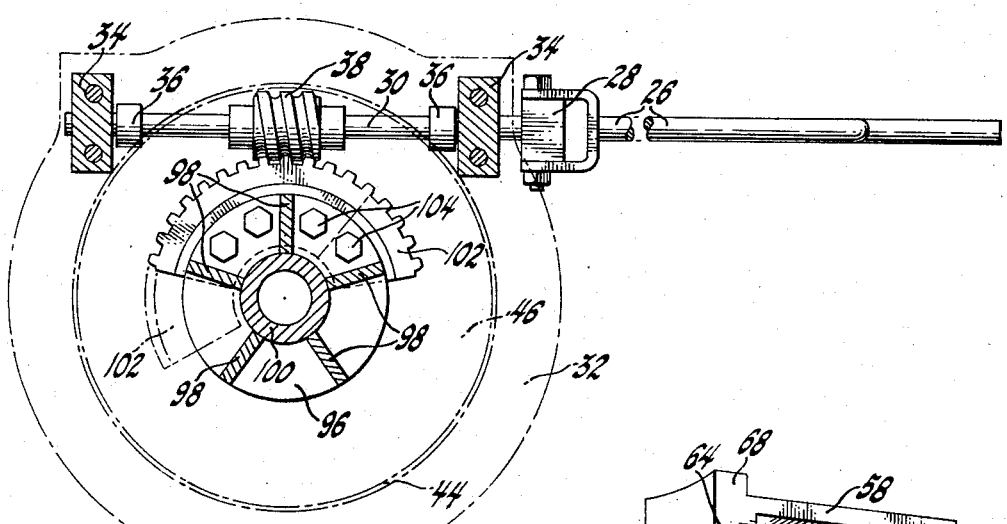
Fig.7
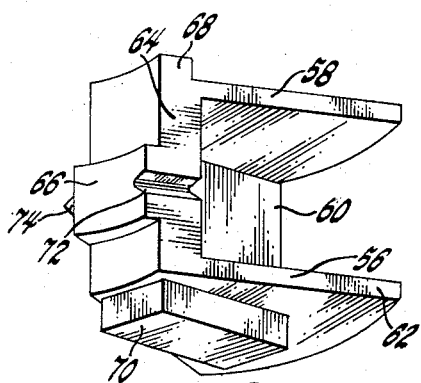
Fig.9
Fig.8
INVENTOR
Corless B. Nelson
BY
J.C. Thorpe
ATTORNEY United States Patent Office 2,903,267
Patented Sept. 8, 1959

2,903,267

CENTERING AND LOCKING MEANS

Corless B. Nelson, Chicago, Ill., assignor to General Motors Corporation, Detroit, Mich., a corporation of Delaware Application August 26, 1953, Serial No. 376,562

3 Claims. (Cl. 279—66)

This invention relates generally to jaw clutches and more particularly to special means for receiving, centering, and anchoring motor truck semi-trailer king pins.

Recently attempts have been made to use railway vehicles to haul motor truck semi-trailers between points normally constituting the longer hauls for these truck semi-trailers. In loading the semi-trailers on the railway vehicles, it has been the usual practice to maneuver the wheels of the semi-trailers onto the vehicle first and then locate the semi-trailer king pin over means on the railway vehicle provided with small holes of approximately the same diameter as the king pins for the reception thereof. It has been found when attempting to maneuver the truck semi-trailers onto the railway vehicle, however, that it is extremely difficult to exactly center the semi-trailer king pins over the small holes heretofore provided so that they can be secured therein. Furthermore, once the pins have finally been located in the small holes provided therefor there are no means to assure that the pins will remain anchored in the holes during transporting of the semi-trailers, other than the weights of the semi-trailers and certain makeshift arrangements (anchoring struts, etc.) which at best are unreliable and involve considerable effort and time to apply.

This invention has therefore been proposed to eliminate the necessity for exactly centering or exactly positioning the semi-trailer king pin over its receiving means. It achieves this result by providing a plurality of radially movable jaws manually or otherwise operable which when retracted form a circular opening substantially larger in diameter than the trailer king pin and in which the king pin need only be generally located. By constructing and operating the jaws so that they radially converge to form a king pin opening of exact size over the desired location, the king pin and semi-trailer are precisely located to be safely transported on the railway vehicle.

In addition to accomplishing the above result the proposed invention automatically and uniquely locks the jaws in place around the semi-trailer king pin when the desired location of the king pin has been achieved so that they cannot be retracted except by certain means which also constitute one of the features of this invention. To further understand and appreciate the features of this invention and the operation thereof, reference is made to the accompanying detailed description and drawings in which:

Fig. 1 also shows in outline a portion of a motor truck semi-trailer having a king pin at its forward end and illustrates how the king pin is received in the king pin centering and anchoring means.

Fig. 3 is a top view of the king pin centering means with the upper plate thereof broken away showing the jaws locked in position by associated, unique pivoted links to thereby center and anchor the semi-trailer king pin in a precise location.

Fig. 4 is a view similar to that of Fig. 3 except that the jaws are retracted and the king pin has been removed and only its outline remains to indicate its diameter relative to the diameter of the opening between the jaws when retracted.

Fig. 5 is a perspective view of one of the links which pivotally connects a jaw to the non-rotating portion of the centering means and shows in detail a flat resilient spring having its ends frictionally clinching the ends of the link to further improve the locking feature of the clutch and to prevent rattling between certain parts of the centering and anchoring means.

Fig. 6 is a section taken on the line 6—6 of Fig. 3 showing how the semi-trailer king pin (in outline) is anchored in the king pin receiving and anchoring means by means of small projections on the jaws which are received in an annular groove in the king pin.

Fig. 7 is a view taken on the line 7—7 of Fig. 6 and shows details of the gearing which is manually operated to move the jaws in their guide slots.

Fig. 8 shows how a rotating turntable or cam plate carrying the jaws in slots therein is supported so that it will turn inside a stationary bottom plate of the centering and anchoring means.

Fig. 9 is a perspective view showing the shape and configuration details of one of the jaws.

Figure 1:
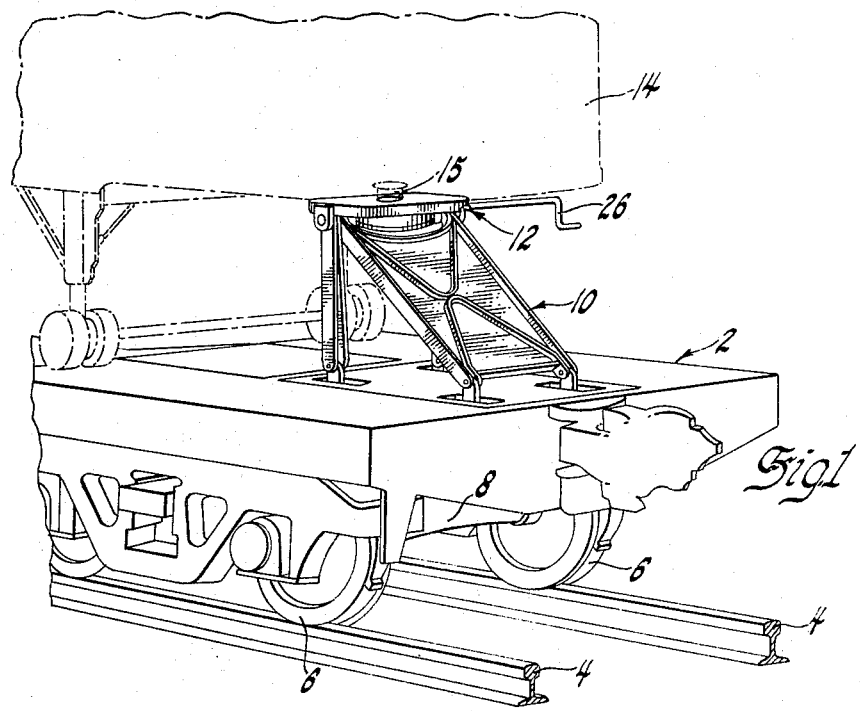
Fig. 1 is a perspective view of the end of a railway vehicle having a support mounted thereon with the new king pin centering and anchoring means pivotally secured thereto.
Figure 2:
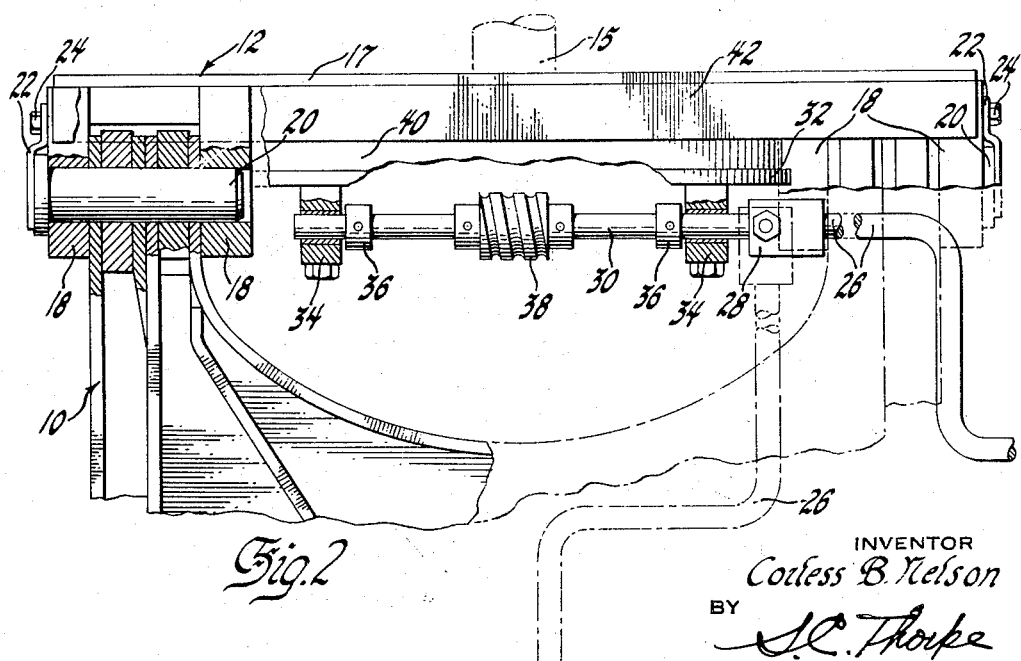
Fig. 2 is an enlarged view of the king pin centering and anchoring means as seen from the end of the railway vehicle with parts broken away and in section to show the manner in which the king pin centering means is pivotally secured to a support on the railway vehicle and also details of the manual means for operating the king pin centering and anchoring means.

In Fig. 1 one end of a railway vehicle, indicated generally by the numeral 2, is shown supported on rails 4 by the usual wheels 6 and axles 8. Mounted on the end of the railway vehicle 2 is a resilient shock absorbing support 10 to which is pivotally secured the new king pin centering and anchoring means, indicated generally by the numeral 12. In order to illustrate and properly describe this new king pin centering and anchoring means, a motor truck semi-trailer 14 has been shown in outline as being supported at one end of the railway vehicle 2 and having a king pin 15 with an annular groove 16 adapted to be received and anchored in the semi-trailer king pin centering and anchoring means 12.

Referring now to Figures 2, 3, 4 and 6 it may be observed that the king pin centering means 12 is provided with a top plate 17 having a hole 19 (Figure 6) in the center thereof. To the underside of the top plate 17 and spaced from opposite sides of the hole 19 are secured two pairs of aligned bearing blocks 18 (Figure 2) which pivotally attach the king pin centering means 12 to the resilient shock absorbing support 10 by means of pins 20 extending through suitable holes provided in the bearing blocks 18 and the upper portion of the resilient shock absorbing support 10. The pins 20 are held in place by small retaining plates 22 secured to the outer of each pair of bearing blocks 18 by studs 24. A crank 26 is pivotally secured at 28 to a shaft 30 which is rotatably supported on the under side of a bottom plate 32 between depending fabricated bearing supports 34. To prevent longitudinal movement of the shaft 30 with respect to the bearing supports 34, collars 36 are keyed or otherwise secured to the shaft 30. Intermediate the bearing support 34 and the collars 36 is a worm gear 38 which is also keyed or otherwise suitably secured to the shaft 30 to rotate therewith.

It will also be noted from examination of Figures 2, 3, 4 and 6 that the body of the semi-trailer king pin centering and anchoring means comprises the aforementioned top plate 17, the generally circular bottom supporting plate 32 and a circular side plate 40 extending vertically between and secured to the top plate 17 and the bottom plate 32. A reinforcing rim 42 is secured to and extends around the outer edge of the top plate 17. The bottom plate 32 has a circular hole 44 in the center thereof in which is positioned a supporting turntable or cam plate 46. The cam plate 46 is held in position in the hole 44 so that it may rotate with respect to the bottom plate 32 by means of upper and lower supports 48, 50 secured to the bottom plate 32 by studs 52. (See also Fig. 8.) The cam plate 46 is provided with a plurality of radially extending rectangular guide slots or grooves 54. Positioned in each of the slots 54 is a jaw 56.

Details of the jaws 56 are shown in Figures 3, 4 and 9 wherein it is seen that each jaw comprises an upper wall 58, vertically extending side walls 60, a lower wall 62 and a center wall 64. The center wall 64 is provided with an inwardly extending projection 66 for engagement in the king pin annular groove 16 and an upwardly extending projection 68 which in combination with the edge of the hole 19 in the top plate 17 limits the outer radial movement of each jaw. The lower wall 62 has formed thereon or secured thereto a rectangularly shaped depending projection 70 which is adapted to be received in any one of the slots 54 for movement therealong. Guiding grooves 72 are provided in the end of wall 64 for receiving associated guiding projections 74 on the adjacent jaw. As best seen in Figures 3 and 4 each jaw 56 is provided with an inner curved surface 94 whose function will be described later in the operation of the device.

Returning again to Figures 3 and 4 it will be observed that each jaw 56 is pivotally connected by means of a pin 76 to one end of a link 78. The other end of each link 78 is pivotally connected to the top and bottom plates 17 and 32 by means of a similar pin 80. As particularly shown in Figures 5 and 6 each link 78 has large bearing surfaces 82 extending approximately to the center of the link which stabilize the link during its movement between the top and bottom plates. A flat spring 84 which is creased at the center thereof or otherwise bent has its ends including outer end surfaces 90, 92 spun around the ends of link 78 so that they frictionally clinch the ends of the links 78 and are movable longitudinally relative thereto. The links 78 with the springs 84 attached thereto in the manner described have, as already mentioned, one end pivotally connected to the top and bottom plates 17 and 32. On either side of this connection and secured to the bottom plate 32 are triangular cams 86 whose cam surfaces 88 engage the outer end surfaces 90 of the springs 84. The inner surfaces 94 of the jaws 56 engage the opposite outer end surfaces 92 of the springs 84.

In Fig. 7 it will be observed that the cam plate 46 has a plate 96 secured thereto by means of ribs 98 and a center section 100 to which is bolted a gear segment 102 by the studs 104. The gear segment 102 is positioned so that its teeth will mesh with the worm gear 38.

The operation of the new semi-trailer king pin centering and anchoring means is as follows:

Assuming that the jaws 56 are in the retracted position as shown in Fig. 4, the semi-trailer 14 with its king pin 15 may be suitably maneuvered so that, when lowered, the bottom surface of the semi-trailer from which the king pin extends will come in contact with and rest on the top plate 17, and the king pin will extend into the opening between the jaws 56 to position the annular groove opposite the jaw projections 66. The handle 26 is then raised so that it can be operated to turn the shaft 30, the worm gear 38, and consequently the gear segment 102 and the cam plate 46. As the cam plate 46 is turned relative to the top and bottom plates 17 and 32, the projections 70 on the jaws 56 move radially along the slots 54 toward the center of the cam plate 46. The jaws to which the semi-trailer king pin happens to be closest first abut the king pin and shift it toward the center of the cam plate 46 at which point all of the jaws 56 will come in contact with the semi-trailer king pin as shown in Figures 3 and 6. When the jaws 56 are positioned as shown in Figures 3 and 6 the projections 66 reside in the groove 16 of the semi-trailer king pin so that the king pin cannot be lifted out without first retracting the jaws 56. It will also be noted that when the jaws are in the position shown in Fig. 3, the links 78 with the springs 84 frictionally clinched thereto are located so that the directions of any forces exerted by the king pin against the jaws 56 act radially outward against the links 78 and are co-incident with the longitudinal axis thereof which passes through the pivot pins 76 and 80. By positioning these links and jaws in the manner described the jaws 56 are automatically locked in place and cannot be retracted without again turning the cam plate 46. To prevent turning the cam plate 46 too far a stop 110 is provided on the cam plate which abuts one of the upper supports 48 when the longitudinal axes of the links are co-incident with various radii of the cam plate.

To further improve the operation and automatic locking feature of the centering and anchoring means the springs 84 have been provided. As stated, the springs 84 can frictionally move with respect to the ends of the links 78. This movement is utilized to assure that the links 78 remain in their over center or radial positions relative to the cam plate 46. This is accomplished in the following manner: As the links 78 are turned, the springs 84 are each in constant engagement with a surface 88 and a surface 94 because of the biasing of the springs by means of the creases or bends at the centers thereof. As the links approach their over center or radial positions, the end surfaces 90 of the springs 84 start to expand into small recesses 108 which are provided between each of the sets of triangular cams 86. Once the links are in their radial or over center positions the end surfaces 90 have fully entered the recesses 108 which in combination with the springs 84 act as detents tending to prevent the links 78 from moving from their over center or radial positions. In addition to providing a unique biasing means for the over center links 78, the springs 84 also prevent rattling and uncontrolled movement between the jaws 56 and the links 78 as well as between the links 78 and the botom and top plates 17, 32.

I claim:

1. Anchoring means for locking a member in a predetermined position comprising a supporting plate having an opening therein, at least three links of equal length each having an end pivotally connected to said plate, said ends being connected to said plate in a circle at equally spaced intervals about said opening, a jaw for each of said links pivotally connected to its associated link at the free end thereof, a turntable supported by holding means secured to said plate and rotatable within said opening about an axis through the center of said circle, said turntable movably supporting said jaws, radially extending guide means on said turntable arranged at equally spaced intervals, said guide means engaging said jaws for guiding said jaws radially back and forth whereby a circular opening about said axis and variable in size is defined by said jaws, said jaws having a position in which said links extend radially toward the center of the opening defined by said jaws and normal to said axis to thereby lock said jaws against movement by forces acting thereagainst away from the center of the opening defined by said jaws.

2. Anchoring means for locking a member in a predetermined position comprising a supporting plate having an opening therein, at least three links of equal length each having an end pivotally connected to said plate, said ends being connected to said plate in a circle at equally spaced intervals about said opening, a jaw for each of said links pivotally connected to its associated link at the free end thereof, a turntable supported by guiding means secured to said plate and rotatable within said opening about an axis through the center of said circle, said turntable movably supporting said jaws and having radially extending slots therein, said slots being equally spaced about the center of said circle, said jaws having projections extending into said slots and engaging the same for guiding said jaws radially back and forth along said slots whereby a circular opening about said axis and variable in size is defined by said jaws, said jaws having a position in which said links extend radially toward the center of the opening defined by said jaws and normal to said axis to thereby lock said jaws against movement by forces acting thereagainst away from the center of the opening defined by said jaws.

3. The structure of claim 1 having combined therewith detent means on said supporting plate engaging said links to assist holding said links radially extended toward the center of said opening.

References Cited in the file of this patent
UNITED STATES PATENTS

| | | |
|---|---|---|
| 2,036,344 | Menhall | Apr. 7, 1936 |
| 2,099,288 | Allen | Nov. 16, 1937 |
| 2,215,903 | Edwards | Sept. 24, 1940 |
| 2,664,611 | Shomber | Jan. 5, 1954 |